United States Patent [19]

Anderson

[11] 4,236,736
[45] Dec. 2, 1980

[54] HOSE COUPLING

[75] Inventor: Robert V. Anderson, Fort Worth, Tex.

[73] Assignee: Turnbuckle Products Corporation, Fort Worth, Tex.

[21] Appl. No.: 901,493

[22] Filed: May 1, 1978

[51] Int. Cl.³ .................... F16L 33/22; F16L 41/00
[52] U.S. Cl. ................................ 285/150; 285/175;
285/177; 285/248; 285/330; 285/334.5;
285/398; 285/419; 285/DIG. 2
[58] Field of Search ............ 285/248, 371, 398, 334.5,
285/334.2, 334.3, 330, 419, 249, 247, 387, 397,
150, 175, 177, 245, DIG. 2; 403/43, 44, 45, 46,
47, 48

[56] References Cited

U.S. PATENT DOCUMENTS

| 96,962 | 11/1869 | Reinshagen | 285/330 |
|---|---|---|---|
| 610,321 | 9/1898 | Davey | 285/334.5 X |
| 731,635 | 6/1903 | Vandegrift et al. | 403/46 |
| 792,626 | 6/1905 | Stephens | 285/248 X |
| 2,137,137 | 11/1938 | Goldacker | 285/387 X |
| 2,423,632 | 7/1947 | Ansorge | 285/249 |
| 3,408,099 | 10/1968 | Appleton | 285/247 |
| 3,606,396 | 9/1971 | Prosdocimo et al. | 285/177 |

FOREIGN PATENT DOCUMENTS

| 46192 | 9/1932 | Denmark | 285/398 |
|---|---|---|---|
| 2005423 | 8/1970 | Fed. Rep. of Germany | 285/387 |
| 411615 | 6/1934 | United Kingdom | 285/248 |

Primary Examiner—Thomas F. Callaghan
Attorney, Agent, or Firm—Wofford, Fails & Zobal

[57] ABSTRACT

An improvement in an accessory for a garden hose and the like in which an end of the hose is to be connected with a supplementary fitting characterized by a centerpiece adapted to sealingly receive the end of the hose, a gripper for moving longitudinally into gripping relationship with the hose, a turnbuckle for drawing the gripper into gripping relationship with the hose responsive to relative rotational movement of the turnbuckle with respect to the gripper and rotation prevention means to prevent relative rotational movement between the gripper and the centerpiece. Also disclosed are preferred structures and embodiments in which, for example, a whole coupling has mirror image type centerpieces, grippers, turnbuckles, and rotation prevention means; dual slope inverted frusto conical sections; right hand and left hand threads for effecting the longitudinal movement of the grippers; the multiple-piece structure of the turnbuckle insert; the tangs on the grippers engaging slot means on the centerpiece to prevent relative rotation; the retention structure on the tangs limiting axial travel of the grippers; and the removable inverted frusto conical sections of the centerpiece.

40 Claims, 19 Drawing Figures

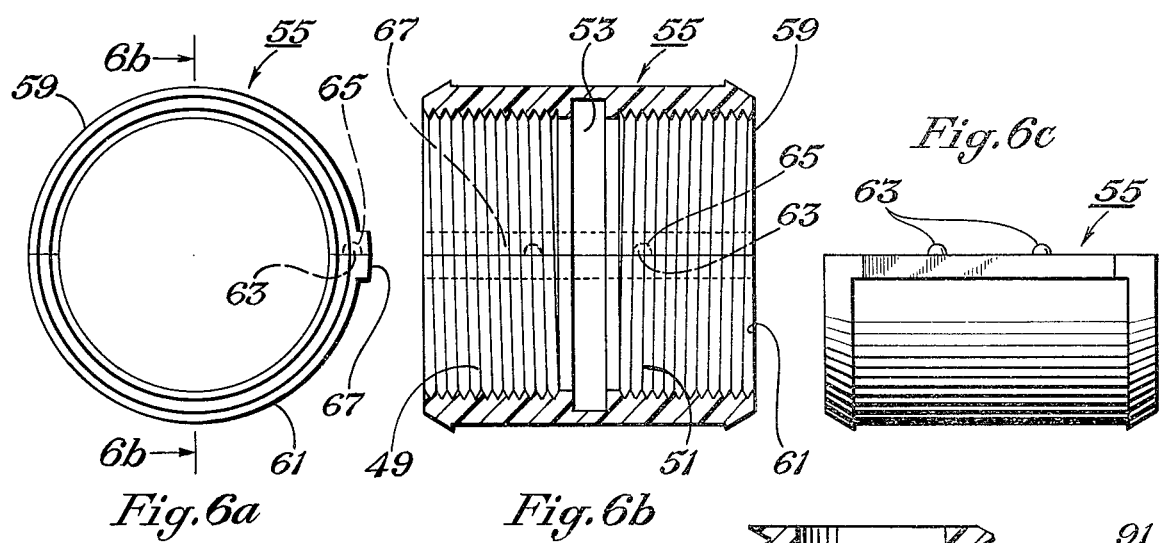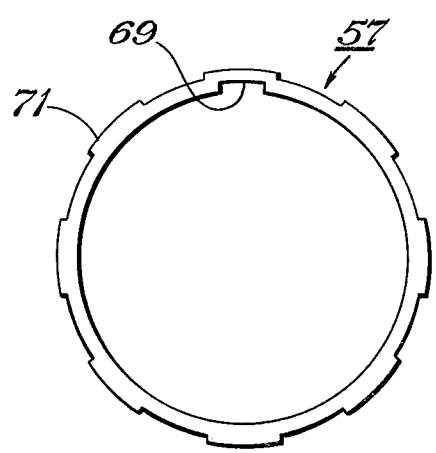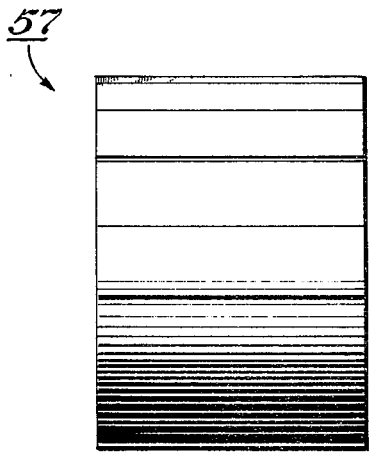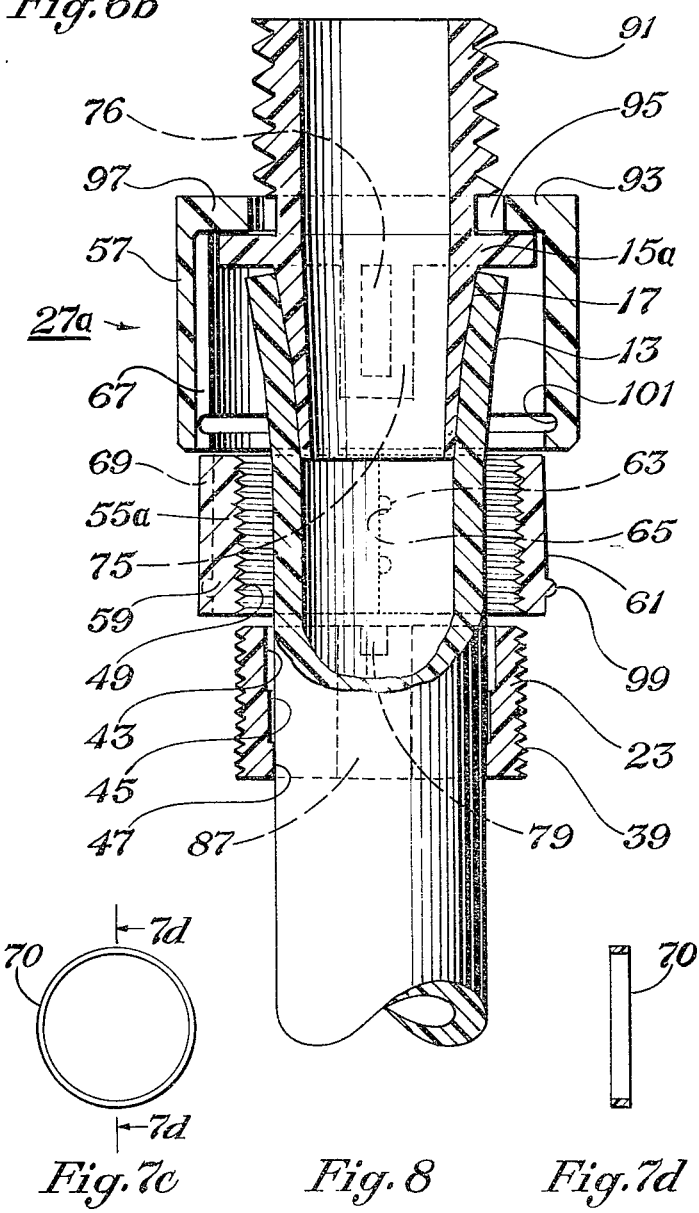

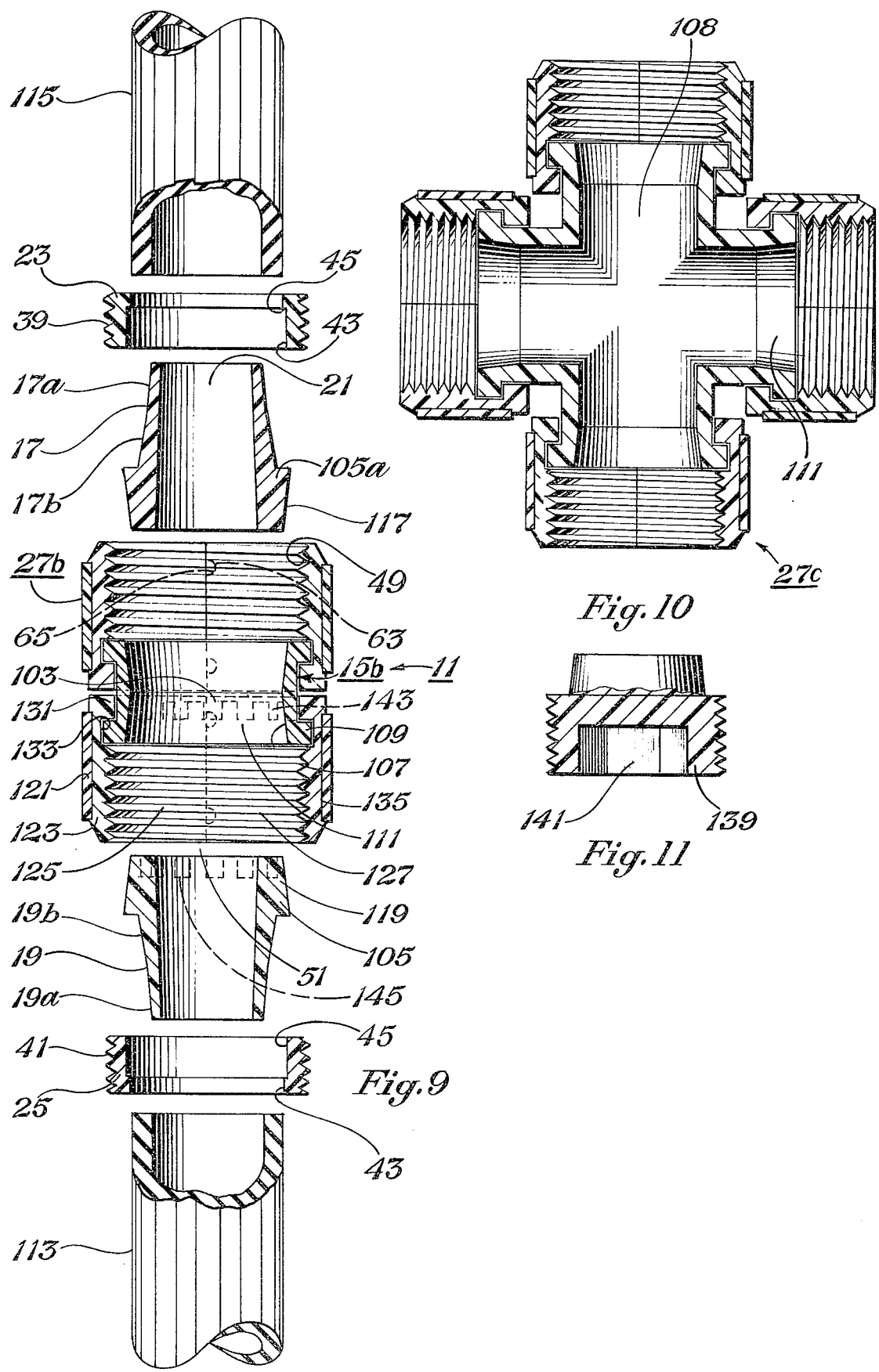

HOSE COUPLING

BACKGROUND OF THE INVENTION

1. Field of the Invention

This invention relates to an accessory for a hose, or flexible conduit in which an end of the hose is to be connected with a supplementary fitting. More particularly, this invention pertains to couplings or other accessories for a garden hose and the like in which the end of the hose is to be connected with another end of the hose or the like.

2. Description of the Prior Art

The prior art has seen the development of a wide variety of hose couplings or other accessories for use with a conduit in which one end of the hose is to be connected with a supplementary fitting. Typical of these U.S. patents and the technology they disclose of the following U.S. Pat. No. 145,731 discloses a hose coupling with slotted, threaded sleeve that is compressed around the end of the hose by means of a tapered nut that is screwed over the compressible sleeve. U.S. Pat. No. 157,840 has a rim B drawn toward a sleeve C with a hose end therebetween when the tube section A is screwed into B. It has a male-female coupling. U.S. Pat. No. 735,401 discloses a hose coupling with a center lock piece and gripper arrangement for holding the hose between two annular pieces. It employs male-female sections a hollow plug with a threaded head and tapering stem, gasket and hose ends received between the tapering stem and annular piece. U.S. Pat. No. 1,186,722 discloses a hose coupling have a tubular core adapted to receive a wrench in the collar and opposite ends threaded right and left hand threads, loose fitting cups with tapered flanges and expansion nuts operable to expand and clamp the tubing responsive to rotation of the collar and core. U.S. Pat. No. 1,509,484 describes a coupling for lead pipe in which a frusto conical section is pulled onto a centerpiece by way of male-female relationships. U.S. Pat. No. 3,865,410 describes a compression joint coupling for pipes comprising a stiffener that is inserted into the bore of the pipe, a radial flange and incline with means for tightening so as to compress radially and grip the pipe in the annular space.

None of the prior art, as can be seen from the illustrative patents, have solved the problem of providing an economical fitting in which an end of the hose can be squared off and inserted into the coupling half, with another half of a coupling or another fitting on the other end and tightened in place by an economical apparatus. In particular, none of the prior art has been totally satisfactory in solving the problems of having pieces of apparatus that can be cast or molded in economical molding operations and readily freed from the molds without requiring collapsible inserts for tubular pieces and the like; that can be readily snapped into place to facilitate assembly; and yet be operable by hand to effect the desired interconnection of the end of the hose with the fitting.

SUMMARY OF THE INVENTION

Accordingly, it is an object of this invention to provide an economical interconnector for connecting the end of a hose with another fitting, as for connection with another end of a second hose, obviating the difficulties with the prior art and providing individual pieces that can be readily molded and readily assembled for economical manufacture.

It is also a specific object of this invention to provide an accessory for a hose that accomplishes the foregoing object and provides pieces that can be readily assembled, allow simple insertion of a squared off end of the hose, and then tightened to hold it in place by merely hand tightening without requiring tools or the like.

These and other objects will become apparent from the descriptive matter hereinafter, particularly when taken in conjunction with the appended drawings.

In accordance with this invention there is provided an accessory for a hose in which an end of the hose is to be connected with a supplementary fitting and incorporating the improvement comprising:

a. a centerpiece sealingly connected with a supplemental fitting and having a bore penetrating longitudinally therethrough and having concentrically disposed about and adjacent at least one end of the bore an inverted frusto conical section adapted to sealingly receive on its exterior surface the interior of the end of the hose and to support the end against tightening by a gripper means;

b. at least one gripper means disposed concentrically about the frusto conical section with sufficient annular clearance to receive the end of the hose; the gripper means having a first portion of a longitudinal moving means, such as a thread, for moving it longitudinally of, or along the axis of, the frusto conical section to grip the external hose end responsive to relative rotational motion between the gripper means and a surrounding turnbuckle means;

c. a turnbuckle means surrounding the gripper means and having a second portion, such as a mating thread, of the longitudinal moving means for moving the gripper means into holding relationship with the end of the hose once it has been inserted over the frusto conical section; and d. a rotation prevention means interrelating the gripper means and the centerpiece so as to prevent relative rotation therebetween. The term "inverted frusto conical section" is employed herein to signify that the section is in the shape of a frustum of a cone which is inverted in the sense of having the hose end inserted first over the small end instead of over the base of the frustum.

With the structure, the end of the hose may be inserted into the gripper means and over the inverted frusto conical surface and the turnbuckle means rotated to move the gripper means into holding relationship with the end of the hose.

In preferred embodiments, the mating and engaging threads on the exterior of the gripper means and the interior of the turnbuckle means cause the gripper means to be moved longitudinally along the axis of the centerpiece.

Also in preferred embodiments, the turnbuckle means comprises at least one outer lock ring to hold the turnbuckle insert together with the threads in alignment and an interior threaded sector, or turnbuckle insert, that is particularly preferably of a plurality of pieces each having the mating sections of the thread. Yet the plurality of pieces can be readily molded, or cast, and removed without requiring collapsible molds or expensive techniques for their forming.

In one embodiment, the gripper means preferably has tangs to prevent relative rotation between the gripper means and the centerpiece; and the tangs have a holding means engaging the centerpiece so as to hold the gripper means in place and prevent their being inadvertently screwed from the turnbuckle means.

In another embodiment, the centerpiece is formed in a plurality of pieces with the inverted frusto conical sections separable. This simplifies manufacture and allows an entire family of fittings to be employed.

BRIEF DESCRIPTION OF THE DRAWINGS

FIG. 4a is an end view of the centerpiece of a production embodiment similar to the embodiment of FIGS. 1 and 2.

FIG. 4b is a cross sectional view taken along the lines 4b—4b of FIG. 4a.

FIG. 6a is an end view of an interior sector, or turnbuckle insert, of a commercial embodiment similar to the embodiment of FIGS. 1 and 2.

FIG. 6b is a side cross sectional view taken along the lines 6a—6b of FIG. 6a.

FIG. 6c is a side view of the lower half of the turnbuckle insert of FIG. 6a.

FIG. 7a is an end view of the outer rotator of the turnbuckle means of a commerical embodiment similar to the embodiment of FIGS. 1 and 2.

FIG. 7b is a side elevational view of the rotator of FIG. 7a.

FIG. 7c is an end view of a ring that can be employed in another embodiment of the turnbuckle means.

FIG. 7d is a cross sectional view taken along the line 7d—7d of the ring of FIG. 7c.

FIG. 8 is a side elevational view of another embodiment of this invention employing a different supplementary fitting.

FIG. 9 is a cross sectional view of another embodiment of a hose accessory, or coupling, in accordance with this invention.

FIG. 10 is a partial cross sectional view of a cross-type central section of a centerpiece of a hose accessory for an embodiment similar to FIG. 9.

FIG. 11 is a cross sectional view of a plug for the cross of FIG. 10.

DESCRIPTION OF THE PREFERRED EMBODIMENT

In the descriptive matter and claims herein the hose may be referred to by the broad term "conduit", which is employed in its sense of any enclosed flexible tubular element for conveying a fluid or the like. In this specific descriptive matter, however, the flexible conduit that is described is a garden hose, since this or similar type flexible conduit will ordinarily be employed with this invention.

Figure 1:
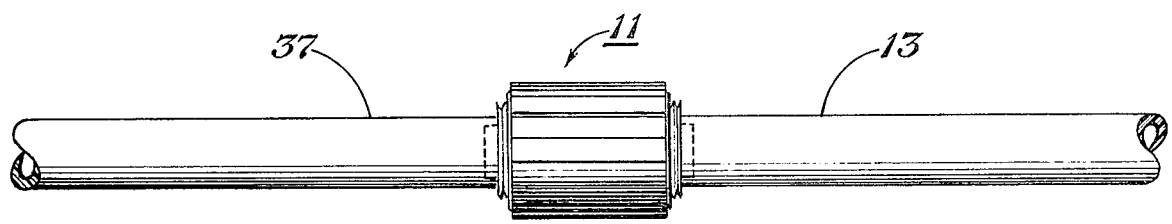
FIG. 1 is a side elevational view of a hose coupling in accordance with one embodiment of this invention.
Figure 2:
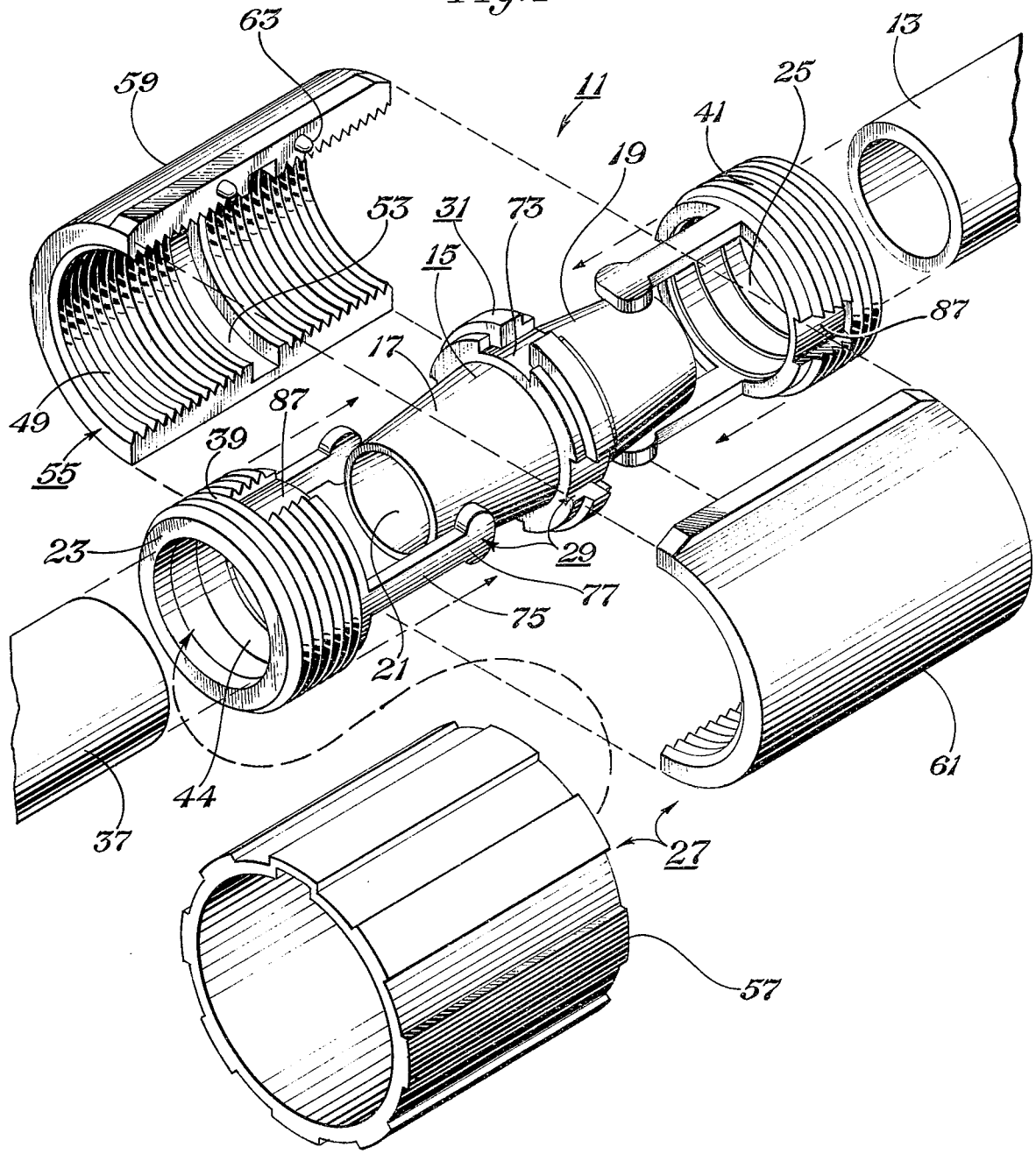
FIG. 2 is an exploded isometric view of the hose coupling of FIG. 1.
Figure 3:
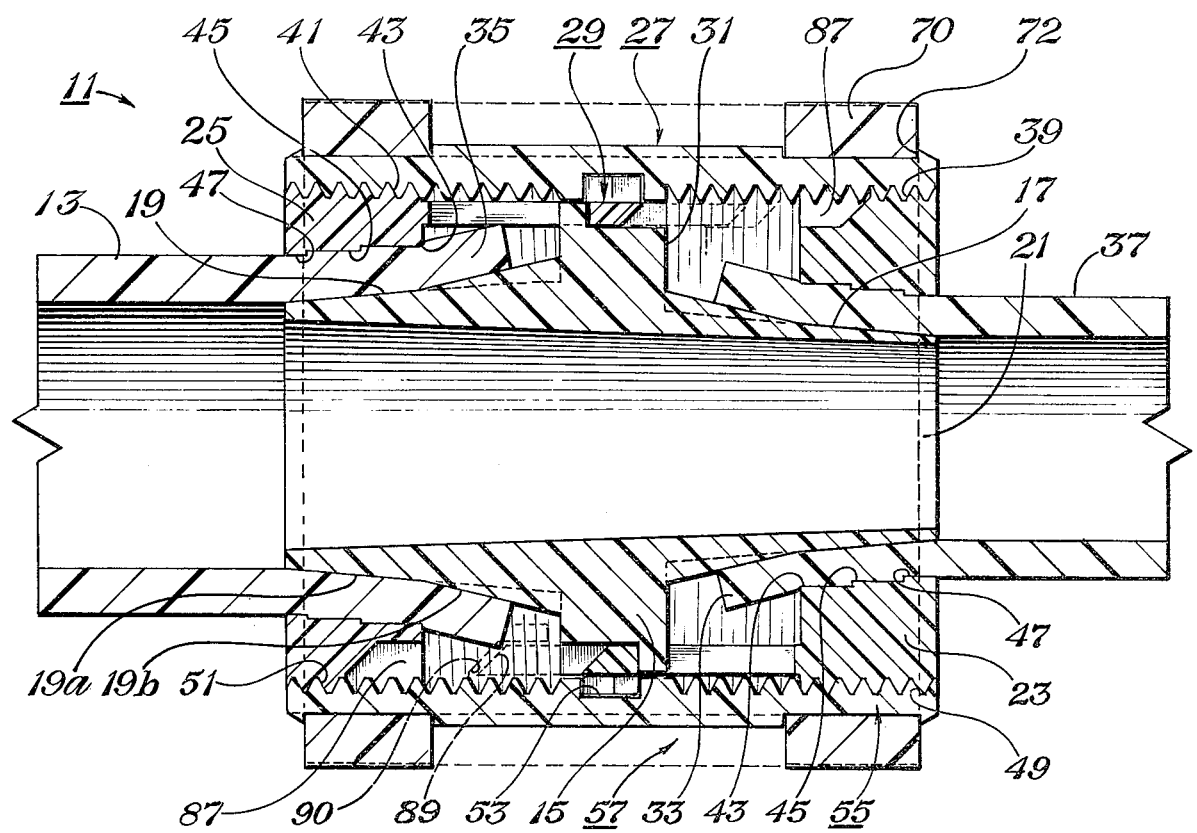
FIG. 3 is a side cross sectional view of a hose coupling similar to that of FIG. 1 with the ends of two conduits in place.
Figures 4A, 4B:
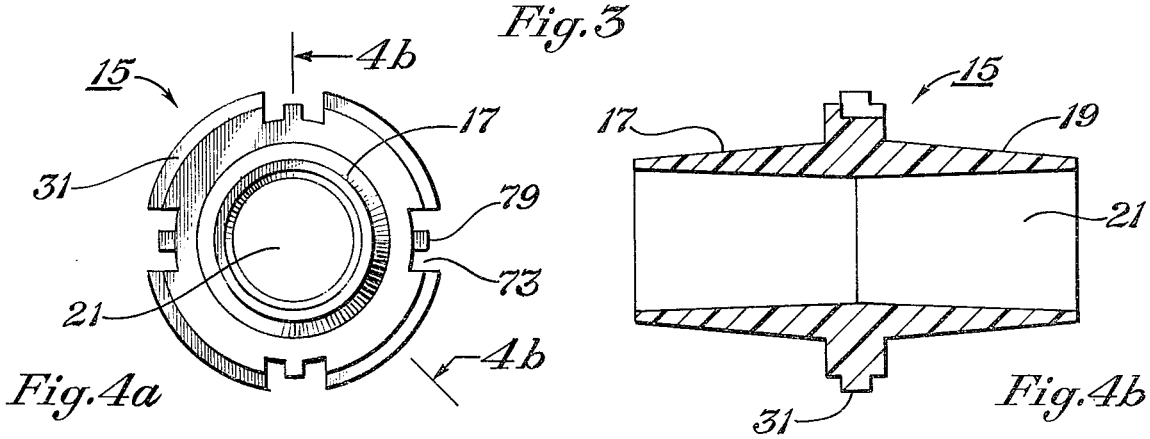

Referring to FIGS. 1–3, there is illustrated a coupling 11 joining ends of a hose 13. As can be seen in somewhat greater detail in FIGS. 2 and 3, the coupling 11 includes a centerpiece 15 having at each end an inverted frusto conical surface 17 and 19 that are concentrically disposed about a bore 21 that penetrates longitudinally therethrough; two gripper means 23, 25 disposed concentrically about the frusto conical sections; turnbuckle means 27 surrounding the gripper means and a rotation prevention means 29 interconnecting the gripper means and the centerpiece so as to prevent relative rotational movement therebetween.

Referring to FIGS. 2–4b, the centerpiece 15 has a centrally disposed radially extending flange 31 for preventing relative longitudinal movement between turnbuckle means 27 and the centerpiece 15. As indicated hereinbefore, a bore 21 extends longitudinally through the centerpiece 15 with respective inverted frusto conical surfaces 17 and 19 disposed concentrically thereabout for sealingly receiving the respective ends 33 and 35 of the conduits 13, 37, FIG. 3.

Inverted frusto conical sections 17 and 19 are strong enough to sealingly receive the ends 33 and 35 and to support the ends against sealing engagement with respect to gripper means 23, 25. The bore 21 may have the same internal diameter extending through the centerpiece or it may comprise different diameters to accommodate different diameters of hoses that are sealingly emplaced over the sections 33, 35. Thus, it can be seen that garden hoses of the same diameter; for example, one half inch garden hose; may be joined or ends of different garden hoses of different diameters may be joined; for example a one-half inch garden hose may be joined with a five-eighths inch garden hose.

The centerpiece may be formed of any material such as metal, like steel, aluminum or the copper alloys like brass; or thermoplastic material. Preferably, it is cast, or molded, from thermoplastic material. The thermoplastic material that is employed may comprise hardened polyethylene, polypropylene, polybutylene, poly vinyl chloride (PVC), acrylonitrile butadiene styrene copolymer (ABS) or even the more expensive and machinable thermoplastic like nylon, Orlon, or Delrin.

Preferably the bore 21 will have a very slight taper from the extreme ends of the centerpiece toward the center to facilitate removal of mold elements. This taper may be in the range of 1–5 degrees; for example, about 2 degrees; with the diameter being slightly smaller at the center of the centerpiece. The frusto conical sections 17 and 19 have a larger degree of taper in the range of 2–15 degrees; for example, about 5 degrees. Preferably, each of the inverted frusto conical surfaces have a plurality such as two sectors of different degrees of taper, as illustrated in FIG. 3. Therein, the first and outer inverted frusto conical sector 19a has a first taper, for example 5°; while a second and inner inverted frusto conical sector 19b has a second taper, for example 10°, that is larger than the first. Either construction, particularly the dual sectors allow the sealing engagement with a variety of wall thicknesses and allow the end of the garden hose to be pushed longitudinally for frictional engagement of the outer wall of the hose with the gripper means disposed thereabout.

The respective slot means of the centerpiece will be discussed in more detail hereinafter with respect to the rotation prevention means 29 for preventing relative rotational motion between the center piece 15 and the gripper means 23, 25.

The gripper means 23, 25, FIG. 2, 3 and 5a–c, as indicated hereinbefore, are disposed concentrically about the inverted frusto conical sections 17 and 19. The gripper means 23, 25 are tubular with internal diameters sufficiently larger than the conical sections 17, 19 to allow in their receiving position annular clearance, or space, between the gripper means and the frusto conical sections to receive the end of the hose that is to be inserted over the inverted frusto conical sections. The receiving position is the condition where the grippers are oppositely extended to the maximum distance away from the centerpiece. Expressed otherwise, a bore 42 penetrates longitudinally through the respective gripper means and is sufficiently larger than the external dimensions of the frusto conical sections 17, 19 as to allow the ends 33, 35 of the garden hoses to be received between the gripper means and the respective frusto conical sections in a sealing relationship.

The gripper means 23 and 25 have respective first portions of longitudinal movement means for moving the gripper means longitudinally of the inverted frusto conical sections responsive to relative rotational motion between the gripper means and the surrounding turnbuckle means 27. While any compatible form of longitudinal moving means; such as, inclined ramp cams and cam followers; may be employed, the illustrated first portion comprises external threads 39, 41 that are respectively of right hand and left hand design so as to be moved longitudinally of a respective inverted frusto conical section toward and away from the central flange 31 responsive to relative rotational motion in the two directions between the gripper means and the surrounding turnbuckle means 27. Each of the gripper means 23, 25 have respective shoulders 43 on their interior bore that engage the respective ends 33 and 35 of the hoses. Preferably there are a plurality of staggered shoulders of decreasing diameters, such as additional shoulders 45, 47. This increases the gripping engagement with the ends 33 and 35 of the hoses. The respective spacing and diameters of the shoulders 43, 45 and 47 may have the same pitch as the angle of inclination of the inverted frusto conical sections to engage the hose simultaneously. On the other hand, the respective distances and diameters may be so related to as to have a pitch somewhat less than the inclined angle of the inverted frusto conical sections 17, 19 such that the shoulders successfully grip the hose with greater force as the turnbuckle is tightened.

The respective gripper means may be formed of any of the materials such as the metals or thermoplastic materials delineated hereinbefore with respect to the centerpiece 15. The advantage of the metals are that they may be machined or readily worked. The advantage of the thermoplastic materials are the economy in manufacture and formulation.

The respective recesses and tangs of the gripper means will be discussed in more detail hereinafter with respect to the rotation prevention means for preventing rotation of the gripper means 23, 25 with respect to the center piece 15 when the turnbuckle means 27 is rotated.

The turnbuckle means 27, FIGS. 1–3 and 6a–c, is disposed concentrically about the gripper means 23 and the centerpiece 15. The turnbuckle means has a second portion of the longitudinal moving means for moving the gripper means longitudinally of the inverted frusto conical sections responsive to relative rotational motion between the gripper means and the turnbuckle means. The second portion of the longitudinal moving means are complementary to and engage the first portion of the longitudinal moving means. Specifically, the turnbuckle means 27 has respective right hand threads 49 and left hand threads 51 disposed on the interior surface and serving as the second portion of the longitudinal moving means. Specifically, the internal threaded sections 49 and 51 peripherally engage the respective external threads 39 and 41 on the respective gripper means 23, 25 for moving the gripper means longitudinally of the centerpiece. It is immaterial, of course, whether the right hand threads or the left hand threads are employed at a particular end of the turnbuckle as long as the threads mate with the respective gripper means received therewithin.

The turnbuckle means 27 has a recess 53 for receiving the radial flange 31 of the centerpiece to prevent relative longitudinal movement between the turnbuckle means 27 and the centerpiece 15. The recess 53 is substantially smooth to allow relative rotational motion between the turnbuckle means 27 and the centerpiece 15.

As illustrated, the turnbuckle means 27 comprises multiple pieces that include an interior sector, or turnbuckle insert, 55, FIGS. 2, 3 and 6a–6c; and lock ring 57, or 70, FIGS. 2, 3 and 7a–d.

Preferably, the turnbuckle insert 55 is formed in multiple pieces, such as the two pieces 59, 61. Each of the pieces have their matching and respective complementary portions of the respective right hand and left hand threads so as to be aligned, or fitted together, to matingly encompass the gripper means. To facilitate this alignment, there are provided locator pins 63, FIG. 6a–6c with mating recesses 65.

It has been possible to employ a turnbuckle insert that fits smoothly within the lock ring as illustrated in FIGS. 1 and 2, so there has not been slippage. Rather than the tight, smooth engagement of the respective mating surfaces of the insert 55 and lock ring 57, positive locking is provided by a spline means 67, FIGS. 6a, 6b for engaging an internal recess in the outer lock ring to ensure rotation in common. The spline 67 is substantially linear so as to facilitate slipping the outer rotator longitudinally of the two pieces of the turnbuckle insert 55.

The outer lock ring 57, FIG. 7a, has a conforming recess 69 for receiving the spline means 67. Moreover the internal dimensions of the outer lock ring 57 closely fit the external dimensions of the assembled two pieces of the turnbuckle insert 55. The outer lock ring has shoulders 71 to facilitate hand tightening.

Early models employed the lock ring 57 and worked very satisfactorily. It was found, however, that the gripper means 23, 25 absorbed substantially all of the radially outward pressure, or force, so less expensive rings could be employed simply to hold the multiple-piece turnbuckle insert 55 together. The original lock ring 57 is illustrated in dashed lines in FIG. 3 for comparison with the simpler construction of the rings 70 and their receiving slots 72. The rings 70 are illustrated in FIGS. 7c and 7d. The rings may be of any cross sectional shape. For simplicity they have been constructed as rectangular so as to be economically manufactured. The rings may range from as small as 1/16 inch wide and 0.050 inch thick up to any larger dimension practical. For example, ⅛ inch × 0.065 inch has been found satisfactory for one-half and ⅝ inch hose couplings. Any number of rings may be employed as desired. As illustrated, two rings 70 are employed, one at each end.

As discussed hereinbefore with respect to the centerpiece 15 the turnbuckle means, both the two inner pieces 59 and 61 as well as the other lock ring 57 or rings 70 can be formed of either metal or thermoplastic. Metals that would be suitable would be those metals delineated hereinbefore with respect to the centerpiece. Similarly, the thermoplastic materials that may be employed have been delineated hereinbefore with respect to the centerpiece 15. Preferably, the respective pieces of the turnbuckle means are molded, or cast. By using the split halves of the turnbuckle insert 55, the moldings are readily formed without intricate and expensive equipment. Yet the turnbuckle means 27 can be rotated with respect to the gripper means that is prevented from rotating by the rotation prevention means 29.

The rotation prevention means 29 of the embodiments described hereinbefore interconnects the gripper means and centerpiece such that the gripper means is prevented from rotating with respect to the centerpiece. The rotation prevention means is adapted to accommodate relative longitudinal movement between the respective gripper means 23 and the centerpiece 15. Specifically, referring to FIG. 2, the rotation prevention means comprises slot means 73, in the flange 31 of the centerpiece 15 and tangs 75 that are connected with the respective gripper means 23, 25 at one end and have their free ends slidably engaging the respective slot means 73. As can be seen in FIG. 2, each of the gripper means has two respective tangs 75 that are slidably engaged within the respective two slot means 73 of the flange 31. To facilitate assembly, the respective tang means have a wider section at their free end. This wider section may be referred to as a tee 77 that is of wider dimensions than the slot means 73 so as to retain the respective gripper means 23, 25 concentrically disposed about the respective inverted frusto conical sections 17 and 19 and facilitate assembly.

Another embodiment of the rotation prevention means was employed in the commercial embodiment of FIGS. 4a, 4b and 5a-c. Therein, the respective slot means 73 had an interiorly protruding shoulder 79 for engaging an opening, or elongate aperture, 81, FIG. 5c. The elongate aperture is blocked by a solid end portion 83, FIG. 5b, so as to retain the gripper means in place. The elongate aperture 81 is defined by bifurcated legs 85 of the tang 75.

Figures 5A, 5B, 5C:
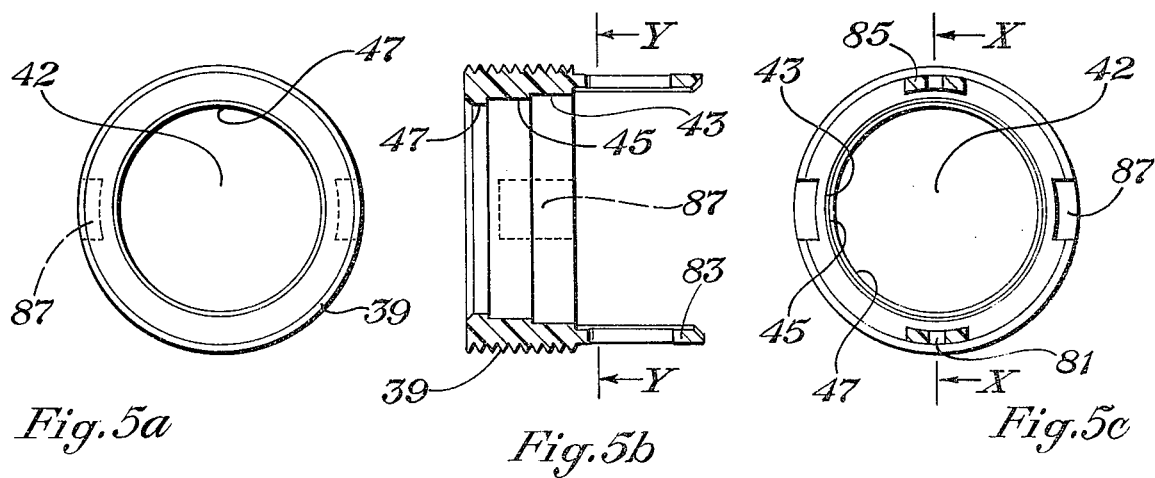
FIG. 5a is an end view of a gripper means of a commerical embodiment similar to the embodiment of FIGS. 1 and 2.
FIG. 5b is a cross sectional view taken along the lines X—X of FIG. 5c.
FIG. 5c is a cross sectional view taken along the lines Y—Y of FIG. 5b.

To accommodate the relative reciprocal motion between the gripper means and the centerpiece 15, recesses 87, FIGS. 2, 3, and 5a, are provided in the opposing gripper means to receive tangs that will be pushed thereinto in the compressed position, or longitudinally inward movement of the respective gripper means responsive to relative rotation of the turnbuckle means 27. The relative compressed position is illustrated by dashed lines 89, 90, FIG. 3. Thus, while longitudinal relative motion is permitted by the respective tangs engaged in the slot means and the recesses 87, relative rotational motion between the gripper means and the centerpiece 15 is prevented. This allows rotation of the turnbuckle means 27, since the respective hose held in one hand prevents rotation of the centerpiece of the gripper means; while the other hand can rotate the turnbuckle means 27.

In operation, the pieces are prepared as indicated hereinbefore, as by molding or the like. The tangs 75 of the gripper means are inserted within respective slot means 73 of the flange 31 of the centerpiece 15 so as to be retained concentrically about the inverted frusto conical surfaces. The respective pieces, or halves 59, 61 of the turnbuckle insert are assembled about the centerpiece flange with their right and left hand threads respectively engaging the right and left hand threads of the gripper means. The outer rotator 57 is slipped longitudinally over the turnbuckle insert to hold it in place. If the rings 70 are employed instead of the lock rings 57, they are slipped into their respective slots 72. After this simple expedient, the coupling is ready to receive the ends of the hose 13.

The ends of the hose are inserted interiorly of the respective gripper means 23, 25 and over the respective inverted frusto conical sections 17, 19. The hose is held with one hand while the turnbuckle means is rotated with the other to draw the gripper means toward the flange and into gripping engagement with the hose. This forces the hose ends into sealing engagement of respective inverted frusto conical sections by the gripping of the shoulders 43-47 of the gripper means onto the exterior surface of the hose. Thus, joinder of the two ends of the hose are complete.

Since assembly is done at factory, all that is initially necessary for the user is to cut out the split or leaking portion of the hose, leaving the ends square insert into the coupling 11, and rotate the turnbuckle with respect to the hose.

Another embodiment that illustrates the generic family of fittings that can be employed with the embodiments of this invention is illustrated in FIG. 8.

Referring to FIG. 8, there is illustrated as the supplementary fitting a threaded connector 91, as for receiving a female threaded fitting on the end of a garden hose, sprinkler, or the like. As described hereinbefore, the centerpiece 15a is provided with the inverted frusto conical section 17 for receiving the end of the hose 13. A single gripper means 23 is provided with the respective shoulders 43-47. In this embodiment tangs 75, shown in dashed lines, are anchored to the centerpiece 15a, instead of to the gripper means 23. This shows the interchangeability and flexibility of design possible. Traversing axially of the tangs 75 are respective slots 76 for slidably encompassing a shoulder 79 on the assembled gripper means 23. This limits the axial travel of the gripper means 23, as well as preventing its rotation with respect to the centerpiece 15a. A recess 87 is provided for receiving the tang 75 and maintaining the gripper means 23 and the centerpiece 15a in relative nonrotating relationships with each other. As can be seen more clearly with respect to the embodiment of FIG. 9 et seq, the tangs 75 can be dispensed with, if the design is such that the gripper means can be pushed against the hose to prevent rotation of the gripper means. The turnbuckle means 27a has respective shoulders 93 that surround a neck and recess 95 and rotatably engage radially outwardly protruding shoulders 97 so as to prevent being pulled longitudinally of the centerpiece when rotated to force the gripper means 23 toward the shoulder 97. As described hereinbefore, the turnbuckle means 27a comprises the turnbuckle insert having the two pieces 59, 61 that have the respective interior thread 49 for engaging the exterior thread 39 of the gripper means 23. A snap ring 99 and recess 101 allow the two pieces 59, 61 to be pushed and snapped into place interiorly of the outer lock ring 57. A spline 67 and a receiving recess 69 are provided to insure that the lock ring and turnbuckle insert 55a rotate in unison. It is immaterial whether the spline is on the exterior of the insert 55a to slide longitudinally in the recess on the lock ring 57 or the converse illustrated in FIGS. 6 and 7.

Elements of the embodiment of FIG. 8 may be formed of the materials delineated hereinbefore.

The respective parts of the embodiment of FIG. 8 are prepared and assembled similarly as are each half of the coupling 11 of FIGS. 1–7*b* described hereinbefore. The end of the hose 13 is inserted over the inverted frusto conical section 17 with the gripper means 23 in place. The lock ring 57 will have been snapped into place over the centerpiece. The turnbuckle insert 55*a* with its assembled two halves is moved upwardly and snapped into place. The respective locator pins 63 will have been mated with their recesses 65 before the two pieces are moved interiorly of the lock ring 57 and snapped into place. Thereafter, the outer lock ring 57 is rotated, also rotating the turnbuckle insert 55*a*. This draws the threaded engaged gripper means 23 into the longitudinal engagement with the exterior of the hose to hold it sealingly into place. Thereafter, the supplementary fitting 91 may be employ as desired.

In FIG. 9, there is illustrated another embodiment of an accessory for a conduit, such as a coupler for a garden hose, in which the centerpiece is comprised of a central section 103 and a plurality of separable hose inserts 105. Specifically, the hose coupling 11 has the elements delineated hereinbefore; namely, the centerpiece 15*b*, the frusto conical surfaces 17, 19, the bore 21, gripper means 23, 25 and the turnbuckle means 27*b*.

The centerpiece 15*b* has, as indicated, the central section 103. The central section 103 is substantially cylindrical although it has respective two way taper 107 in the range 2–5 degrees to facilitate removal of an interior supporting mandrel during molding. Otherwise, the central section 103 is substantially cylindrical with radially protruding shoulders 109 on each end for holding in place the respective turnbuckle means.

The central section 103 may be formed of any of the materials delineated hereinbefore with respect to the centerpiece 15.

The central section is illustrated in FIG. 9 as a two ended coupling. It may be in the form of a tee or as a cross such as the cross 109, FIG. 10. In any event, the respective open ends 111 are designed to matingly engage and receive in sealing relationship with respective ends of the hose inserts 105.

The hose inserts 105 have the respective frusto conical surfaces such as frusto conical surface 19. As indicated, the frusto conical surfaces in the embodiment of FIG. 9 have a pair of tapered sections 19*a* and 19*b* similarly as discussed hereinbefore with respect to FIG. 3. As illustrated in FIG. 9, the hose insert 105 are adapted to receive different sizes of hose. The frusto conical section 19 is adapted to receive ⅝ inch internal diameter hose end 113 and sealingly receive it when the hose end is pushed over the two respective inverted frusto conical sections 19*a* and 19*b*. On the other hand, the hose insert 105*a* is adapted to receive a ½ inch diameter hose end 115 and sealingly receive that end when it is pushed into position on the two different tapers 17*a* and 17*b* of, respectively, 5 and 10 degrees.

Ordinarily, however, the respective gripper means 23 and 25 will have been pushed back over the respective hose ends 113 and 115 before the hose ends are pushed onto the respective inverted frusto conical sections 17 and 19. The respective gripper means 23 and 25 are adapted to hold in place their respective ½ inch and ⅝ inch hose ends on the respective inverted frusto conical sections 17 and 19. To effect this end result, it should be noted that all that is necessary is that the internal bore of the respective hose inserts 105 and 105*a* be of the proper sizes. This is effected by making the cross sectional dimensions of the hose insert 105*a* somewhat thicker at its insert end 117 than is the insert end 119 of the hose insert 105. In like manner, the cross sectional dimensions of the gripper means 23 is greater than the cross sectional dimension of the gripper means 25. In the illustrated embodiment, only two shoulders 43 and 45 are employed on the gripper means since they have been found to be adequate. The taper of the imaginary frustum connecting the innermost portion of the respective shoulders 43 and 45 is the same as the respective outer inverted frusto conical sections; in this case 5 degrees. As illustrated hereinbefore, other taper between the respective shoulders can be employed as desired as long as the end result of sealingly holding the hose ends in place is achieved.

One of the advantages of this embodiment of this invention is that the respective turnbuckle means 27*b* and gripper means 23, 25 can have their outer threads 39, 41 of any desired design. They no longer require right hand and left hand threads, but can be made interchangeable, as long as they are compatible.

The turnbuckle means 27*b* comprise respective outer rings 121 that are snapped into place in their receiving recesses on the exterior of the turnbuckle insert 123. The turnbuckle insert includes the multiple pieces, such as the halves 125, 127 that together define their respective mating threads 49 and 51 for engaging the exterior threads on the gripper means 23, 25. Suitable guide pins and recesses 63, 65 can be employed to facilitate assembly of the threads properly.

In this embodiment, however, the turnbuckle inserts 123 are separate and have interiorly protruding shoulders 131 that are assembled about the radially exteriorly protruding shoulders 109 of the central section 103 to allow rotation without longitudinal movement. Expressed otherwise, the radially exteriorly protruding shoulder 109 is received in recess 133 of the respective turnbuckle inserts 123 for retention longitudinally in place. After the halves are thus assembled, the outer rings 121 are snapped into place in their respective grooves 135.

In operation, the respective gripper means such as gripper means 25 is emplaced over the hose end 113 and the hose inserted onto the inverted frusto conical section 19. The hose then is pushed up until it is tightly and sealingly received; for example, on the second inverted frusto conical section of 10 degrees, section 19*b*. Thereafter, the gripper means 25 is pushed forward to firmly engage the hose end 113 supported on the frusto conical section 19. The insert end 119 of the hose insert 105 is inserted as far inwardly toward the ends 111 of the central section 103 as possible. Thereafter, the turnbuckle means 27*b* is rotated while holding the hose end 113. In like manner, the hose end 115 is assembled interiorly of the gripper means 23 and on the inverted frusto conical section 17. The hose insert 105*a* is inserted as far as possible interiorly of the turnbuckle means 27*b*. The other turnbuckle means 27 is rotated while holding the other hose end 115. The hose ends immobilize the respective insert ends and the gripper means by frictional engagement that serves as the rotation prevention means. Consequently, the respective gripper means are drawn interiorly toward the center, or the central section 103. The frictional engagement of the mating taper 107 of the ends 111 and the insert ends 105 of the hose inserts prevents rotation of the central section 103, even if it has been rotating initially. Consequently, the rotation prevention means is effected by frictional engagement between the hose which is being held, a hose insert, and the central section. This allows the respective turnbuckle means to be tightened as desired. Ordinarily hand tightening is sufficient.

If positive rotation prevention means are desired, coengaging teeth and recesses 143, 145, shown in dashed lines, can be employed on the interior of the throat of the central section 103 and the exterior of the hose inserts 105. These interlocking teeth and recesses thus coact to prevent rotation after they are engaged by insertion of the hose insert for completing assembly on the hose end.

As indicated hereinbefore, the turnbuckle means 27b is comprised of two sectors that may be rotated independently such that each end of the respective hose can be assembled as desired. This allows building a network by use of tees and crosses and the like without requiring more than a pair of hands. Consequently, a homeowner or the like can readily build a plurality of hose sections into a network such as a sprinkler system or the like. It is desirable that portions of crosses or the like could be plugged as necessary. To this end, a plug 139, FIG. 11 is provided. Therein, an insert 141 for an Allen wrench or the like is provided to allow the plug to be screwed into place interiorly of a respective turnbuckle means 27c. The turnbuckle means 27 will include, of course, the respective turnbuckle insert as described hereinbefore with respect to FIG. 9.

The respective elements of the embodiments of FIGS. 9 and 11 may be formed of any materials delineated hereinbefore. Ordinarily, moldable thermoplastic materials are preferred for economy, manufacture and ease of assembly.

While a supplementary fitting is described as being a connector, it is readily apparent that any of the wide variety of fittings employed with garden hoses or conduit can be employed with the respective half of this coupling, or joinder accessory for the conduit.

In view of the foregoing descriptive matter, it can be seen that this invention accomplishes the object set out hereinbefore.

Although the invention has been described with a certain degree of particularity, it is understood that the present disclosure is made only by way of example and that numerous changes in the details of construction and the combination and arrangement of parts may be resorted to without departing from the spirit and scope of the invention, a reference for the latter being had to the appended claims.

What is claimed is:

1. In an accessory for a resilient hose in which an end of the hose is to be connected with a supplementary fitting, the improvement comprising:
  a. a centerpiece sealingly connected with the supplementary fitting and having a bore penetrating longitudinally therethrough and having concentric about the adjacent at least one end of the bore an inverted frusto conical section adapted to sealingly receive on its exterior frusto conical surface the interior of the end of the hose and to support the end against a longitudinal tightening force by a gripper means;
  b. at least one gripper means disposed concentrically about said inverted frusto conical section in receiving position with sufficient annular clearance to receive the end of the hose for insertion over said inverted frusto conical section; said gripper means having a plurality of shoulders of respectively monotonically decreasing radii longitudinally thereof from its end facing said centerpiece toward its other end, each shoulder having its same radius over a predetermined distance longitudinally, such that the distance between said shoulder and said exterior frusto conical surface decreases as said gripper means is moved longitudinally of said centerpiece so as to embed in and grip the resilient hose and retain it in place on said centerpiece when said gripper means is moved longitudinally of said inverted frusto conical surface with the hose in place; said gripper means having a first portion of a longitudinal moving means for moving said gripper means longitudinally of said inverted frusto conical section responsive to relative rotational motion between said gripper means and a surrounding turnbuckle means;
  c. turnbuckle means surrounding said gripper means; said turnbuckle means having a second portion of said longitudinal moving means for moving said gripper means longitudinally of said inverted frusto conical section responsive to relative rotational motion between said gripper means and said turnbuckle means; said turnbuckle means having a second portion of longitudinal moving means complementarily engaging said first portion of said longitudinal moving means; said centerpiece being contained within said turnbuckle means so as to prevent relative longitudinal motion therebetween and permitting relative rotational motion therebetween; and
  d. rotation prevention means cooperating with said gripper means and said turnbuckle means such that said gripper means is prevented from rotating with respect to said turnbuckle means; said rotation prevention means being adapted to accommodate relative longitudinal movement between said gripper means and said centerpiece;

such that after the end of the hose is inserted interiorly of said gripper means and over said inverted frusto conical section, said turnbuckle means can be rotated to move said gripper means longitudinally thereof and grippingly embed in and hold the end of the hose sealingly connected with said inverted frusto conical section.

2. The accessory of claim 1 wherein said gripper means comprises a tubular section having an exterior first thread serving as said first portion of said longitudinal moving means.

3. The accessory of claim 2 wherein said turnbuckle means comprises a tubular section that is rotatably connected with said centerpiece and has an internal second thread engaging said first thread on said gripper means and serving as said second portion of said longitudinal moving means.

4. The accessory of claim 3 wherein said turnbuckle means comprises multiple pieces that include a turnbuckle insert having said second thread and an outer lock ring fittingly engaging said turnbuckle insert.

5. The accessory of claim 4 wherein said outer lock ring and said turnbuckle insert have respective mating spline means and groove means for allowing relative longitudinal movement therebetween for assembly and thereafter preventing relative rotational motion therebetween.

6. The accessory of claim 4 wherein said turnbuckle insert comprises a plurality of pieces to facilitate manufacture; said pieces having complementary sections of said thread interiorly thereof.

7. The accessory of claim 6 wherein said turnbuckle insert comprises two pieces that were manufactured as relative halves to facilitate manufacture and assembly and complementary portions of said thread are molded into the respective halves.

8. The accessory of claim 6 wherein said outer lock ring comprises at least one ring snapped into place about each assembled said plurality of pieces of said turnbuckle insert.

9. The accessory of claim 8 wherein said outer lock ring comprises at least a pair of said rings, one adjacent each end of said assembled plurality of pieces of said turnbuckle insert.

10. The accessory of claim 1 wherein said rotation prevention means of claim 1 comprises at least one tang and slot means adapted to reciprocally receive said tang for accommodating relative reciprocal movement between said gripper means and said centerpiece; said tang being connected with one of said gripper means and said centerpiece and said slot means being disposed in the other of said centerpiece and said gripper means; said at least one tang having a free end that is reciprocally received in said respective slot means so as to prevent relative rotational movement between said centerpiece and said gripper means.

11. The accessory of claim 10 wherein said centerpiece has a plurality of said slot means and said gripper means have connected therewith a plurality of said tangs that are reciprocally received in respective said slot means.

12. The accessory of claim 11 wherein there are at least two said slot means and two said tangs; each said tang having an expanded shape adjacent its free end; said expanded shape being of peripherally greater dimensions than said slot means so as to retain said gripper means in place during assembly and facilitate assembly.

13. The accessory of claim 10 wherein there are at least two said slot means and two said tangs for each gripper means; each said tang having a longitudinal slot defined by a bifurcated leg having a closing obstruction adjacent its free end; said longitudinal slot being movable reciprocally within said slot means; each slot means having a radially outwardly protruding holding means engaging each respective said longitudinally slot so as to retain said gripper means in place and limit axial travel of respective said gripper means.

14. The accessory of claim 1 wherein said fitting comprises a threaded section for attaching a second conduit thereto.

15. The accessory of claim 1 wherein said improvement is a first half of a coupling for joining together two ends of two hoses and said fitting comprises a second half of the coupling and said improvement comprises:

a. said centerpiece having a central radially extending flange; said centerpiece having on both ends longitudinally extending said bores and said inverted frusto conical sections for sealingly receiving the respective two ends of the respective two hoses;

b. two said gripper means disposed respectively concentrically about respective said inverted frusto conical sections and having exterior threads of respective right hand and left hand designation for moving longitudinally toward said flange of said centerpiece responsive to relative rotational motion between said gripper means and said turnbuckle means;

c. said turnbuckle means incorporates a recess means for receiving said flange of said centerpiece, incorporating respective interior right hand and left hand threads adjacent respective ends and peripherally engaging said respective exterior right hand and left hand threads of respective said gripper means so as to move said gripper means toward and away from said flange on said centerpiece responsive to the proper relative rotational motion for grippingly holding the ends of the hoses sealingly onto respective said inverted frusto conical sections; and d. a plurality of rotation prevention means cooperating with respective said gripper means and said turnbuckle means for preventing relative rotational motion between said gripper means and said centerpiece while accommodating relative axial motion therebetween;

such that rotation of said turnbuckle means in one relative rotational direction will effect axial movement of said gripper means onto and in gripping relationship with respective ends of hoses that have been sealingly inserted onto respective said inverted frusto conical sections to couple said ends together, and rotation of said turnbuckle means in another relative rotational direction will effect release of said gripper means by opposite axial movement.

16. The accessory of claim 15 wherein said turnbuckle means comprises multiple pieces including a turnbuckle insert having said second thread of respective right hand and left hand design and having an outer lock ring fittingly engaging said turnbuckle insert.

17. The accessory of claim 16 wherein said outer lock ring and said turnbuckle insert have respective mating spline means and groove means for allowing relative longitudinal movement for assembly and thereafter preventing relative rotational movement therebetween.

18. The accessory of claim 16 wherein said turnbuckle insert comprises a plurality of pieces to facilitate assembly; said pieces having complementary sections of said thread interiorly thereof.

19. The accessory of claim 18 wherein said turnbuckle insert comprises two pieces that are cast in the form of halves to facilitate assembly and said two halves have respective complementary sections of said right and left hand design threads.

20. The accessory of claim 18 wherein said outer lock ring of claim 16 comprises a pair or rings snapped into place about the assembled plurality of pieces of said turnbuckle insert.

21. The accessory of claim 16 wherein said inverted frusto conical sections each have a plurality of tapered sections of respective tapers, the outer respective tapered sections having a lesser degree of taper than the longitudinally interior tapered sections on each of the respective ends.

22. The accessory of claim 15 wherein said inverted frusto conical sections comprises a plurality of at least two tapered sections, including an outer section and an inner section; said outer section having a degree of taper that is less than said inner section.

23. The accessory of claim 15 wherein each said rotation prevention means comprises a plurality of respective tang and slot means adapted to reciprocally receive a respective said tang for accommodating relative reciprocal movement between said gripper means and said centerpiece; said tangs being connected with one of said gripper means and said centerpiece and said slot means being disposed in the other of said centerpiece and said gripper means; said tangs having respective free ends that are reciprocally received in respective said slot means so as to prevent relative rotational movement between said centerpiece and respective said gripper means.

24. The accessory of claim 23 wherein there are at least two said slot means and two said tangs for each said gripper means; and each tang and slot means including respective holding means for limiting axial travel of respective said gripper means.

25. The accessory of claim 1 wherein said centerpiece comprises a plurality of pieces that includes a central section having at least one receiving end adapted to receive a hose insert; and at least one hose insert having an inverted frusto conical section adapted for sealingly receiving the end of the hose to be inserted thereover; said hose insert having an insert end adapted to be sealingly and conformingly received in said receiving end in said central section.

26. The accessory of claim 25 wherein said rotation prevention means comprises frictional engagement of said insert end of said hose insert with said receiving end of said receiving section, and wherein an end of a hose is inserted over said frusto conical section and said gripper means pushed over said hose to frictionally engage the end of said hose being sealingly retained on said inverted frusto conical section and the frictional engagement therewith coupled with holding of the hose serves as a portion of said rotation prevention means during the early rotation of the turnbuckle means.

27. The accessory of claim 25 wherein said inverted frusto conical section includes a plurality of tapered sections having different degrees of taper and comprises an outer tapered section and an inner tapered section.

28. The accessory of claim 27 wherein said longitudinally outer taper has a lesser taper than said inner taper and both tapers are within the range of 2–15 degrees.

29. The accessory of claim 1 wherein said centerpiece comprises a plurality of pieces that include a central section having a plurality of receiving ends adapted to receive respective hose inserts; and a plurality of respective hose inserts having respective inverted frusto conical sections adapted for sealingly receiving the respective ends of respective hoses to be inserted thereover.

30. The accessory of claim 29 wherein said accessory is a hose coupling and said central section has a pair of diametrically opposite receiving ends with a central bore penetrating longitudinally therethrough.

31. The accessory of claim 29 wherein said central section has three respective sealing ends with respective hose inserts adapted for being sealingly drawn into place with hose ends sealingly inserted over the respective inverted frusto conical sections.

32. The accessory of claim 29 wherein said central section has four respective receiving ends and four respective hose inserts adapted for being sealingly received in respective said hose inserts.

33. The accessory of claim 32 wherein the respective dimensions of said receiving ends are the same and the exterior dimensions of the insert ends of the hose inserts are the same but wherein respective bores and inverted frusto conical sections are adapted for receiving respective and different sized hoses.

34. The accessory of claim 29 wherein said rotation prevention means comprises frictional engagement between respective receiving ends of said central section and the insert ends of respective hose inserts inserted thereinto.

35. The accessory of claim 29 wherein said rotation prevention means comprises co-engaging teeth and recesses on the interior of said receiving ends and the exterior of said hose inserts to be inserted thereinto.

36. The accessory of claim 29 wherein a plug is provided for being screwed interiorly of one said turnbuckle insert.

37. The accessory of claim 1 wherein the spacing and diameters of said plurality of shoulders of said gripper means are such that the angle of inclination of the respective innermost portions of the respective shoulders forms a taper no greater than the taper of the exterior surface of the frusto conical section such that said gripper means can better embed in and grip the hose when the hose is emplaced on said inverted frusto conical section.

38. The accessory of claim 1 wherein said inverted frusto conical section has a plurality of at least two tapered sections, including an outer section and an inner section; said outer section having a degree of taper that is less than said inner section; and wherein the respective spacing and diameters of said shoulders are such that the angle of inclination formed by the respective innermost portions of the respective said shoulders forms a taper no greater than the taper of the outer section of the frusto conical surface such that said gripper means can better grip the hose when the hose is emplaced on said inverted frusto conical section.

39. The accessory of claim 38 wherein said outer section has a taper of about 5° and said inner section has a taper of about 10° and the taper of the respective innermost portions of the respective shoulders is about 5°.

40. The accessory of claim 8 wherein said pieces of said turnbuckle insert includes respective coded, mating protrusions and recesses to facilitate assembly.

* * * * *